Figure 1:
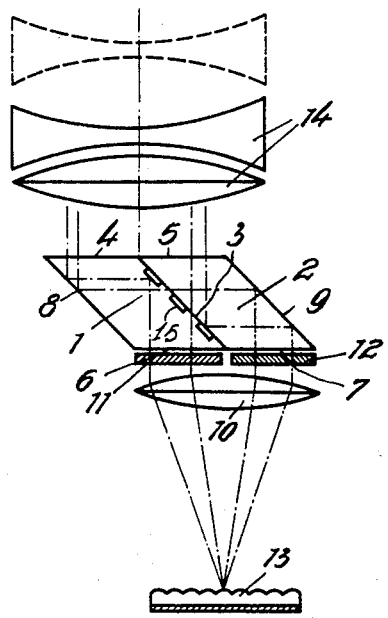

Feb. 6, 1940.    K. RÄNTSCH    2,189,298
OPTICAL SYSTEM
Filed April 1, 1937

Kurt Räntsch, Inventor.
By Gifford, Scull & Burgess,
Attorneys.

Patented Feb. 6, 1940

2,189,298

UNITED STATES PATENT OFFICE 2,189,298

OPTICAL SYSTEM

Kurt Räntsch, Berlin-Steglitz, Germany, assignor to Opticolor Aktiengesellschaft, Glarus, Switzerland, a corporation of Switzerland Application April 1, 1937, Serial No. 134,200
In Germany April 9, 1936

1 Claim. (Cl. 88—1)

My invention relates to improvements in optical systems.

There is a tendency in obtaining plano-parallel air plates in optical instruments such as photometers or spectrometers, on the limit surfaces of which air plates a reflection takes place or a total reflection with respect to media having a greater optical density. These air plates have been hitherto limited by plane surfaces of solid bodies so arranged as to be adjustable or intermediate rings have been employed in forming the distance required therewith.

According to the present invention such air plates consist of two glass bodies placed one upon the other and intimately united together by rubbing, at least one of the glass bodies having one or more indentations. The bottom surfaces of the indentations are in this case made exactly parallel to the original surface before intimately uniting the glass bodies by rubbing. By designing the intermediate space in such a manner, the exact parallelism of the limit surfaces glass-air is ensured, particularly if the thickness of the plates is very small, for instance, amounts only to the length of a light wave.

The new optical system does not consequently employ any third bodies which are placed between the limit surfaces, such as rings, foils or even only a cement or sealing surface, since it has been found that it is not possible to maintain the reflecting surfaces accurately parallel if any further object determines the distance.

It is particularly advantageous to make the indentations in the glass bodies by polishing the surface to the greatest possible extent and then by removing the glass at the desired points with the aid of a mordant; for instance with hydrofluoric acid. In this case it is possible to remove the uppermost glass layers so uniformly that the new free surface remains completely bright and parallel to the original surface. The etching should, however, be carried out only to the smallest possible depth, for instance, to such an extent that the air plate resulting therefrom suffices to produce total reflection. To this end, it will suffice that the indentation in the glass body be of the order of magnitude of the length of a light wave.

The novel design of two parallel reflecting surfaces is particularly advisable if the rays of light reflected on both sides are brought again together to form a common beam, since in this case the condition of perfectly parallel surfaces must be exactly fulfilled, insofar as slight angle errors cause a non-coincidence of the pictures produced by the two beams.

The optical systems according to the invention afford further advantages for the production of a partly transparent reflecting surface acting on both sides, in which surface single areas thereof reflect the light completely, whereas the remaining areas permit the passage of the light without the latter being influenced. In such an arrangement quite a number of pairs of parallel surfaces which are perfectly parallel with respect to one another and separated by transparent parts may be obtained, a condition which cannot be fulfilled by any method hitherto known, since it is not possible to manufacture the intermediate layers required according to the known methods with a uniform thickness.

Figure 2:
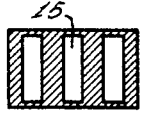

In the accompanying drawing, Fig. 1 is a diagrammatic view of one system embodying the invention;

Fig. 2 is a face view of one of the contacting sides of one of the prisms appearing in Fig. 1.

The novel arrangement according to the invention may be further advantageously employed in optical systems. An optical system for taking two-color pictures on lenticulated films is shown in Fig. 1. It consists of two rhombic prisms 1 and 2 which at the contact surface 3 thereof present parts which permit the complete passage of the rays of light and which reflect the same at both sides, the parts being shown separately in Fig. 2. The reflecting parts are in this case formed by indentations or recesses 15 in only one prism, whereas the other glass body is smooth and is intimately united with the other by rubbing. The areas not cut, shown cross-hatched, enclose the indentations completely so as to ensure a perfect adhesion of the glass bodies. The light falling on each of the front surfaces 4 and 5 is split up by the arrangement shown into two part beams. The half of the light passing through the surface 5 traverses the surface 6 without being deviated, whereas the remaining portion after being reflected by the partly transparent mirror and by the surface 9 leaves the optical system through the part 7.

In the same manner the light passing through the part 4 is split after being reflected by the surface 8 into two partial beams which leave the optical system through the surfaces 6 and 7. The effect of such a system consists, consequently, in the fact that each beam of light passing through a part of the inlet surface is caused to pass through all parts of the outlet surface.

If the prisms 1 and 2 were not intimately united by rubbing according to the invention but separated by a partly transparent silver coating or by a cement surface the surfaces 8 and 9, for instance, would not be any longer strictly parallel, that is to say, the part beams reflected by the surfaces 3 and 9 would present an angular difference.

An optical system provided according to the invention with reflecting surfaces is employed for photographing in colors so as to prevent stereoscopically different pictures which correspond to the individual part colors.

When using the arrangement shown in Fig. 1 for taking pictures on lenticulated films an objective 10 is placed behind the optical system.

The objective is provided with a color filter having two zones 11 and 12 and projects two part pictures on the film 13 which owing to the effect of the lenticular elements on the emulsion are in registry and correspond to the colors of the filters 11 and 12. Without the optical system the beams of light coming from an object reach the objective along different paths and the film through different filters. At points which do not lie in the plane sharply adjusted the pictures produced on the film do not coincide with each other and, consequently, create colored fringes at the edges of the objects. However, if the optical system is placed in front of the objective the stereoscopically different beams of light corresponding to the parts 4 and 5 are mingled with each other and distributed in a completely uniform manner over the parts 6 and 7, i. e., over the filters 11 and 12. The pictures corresponding to the part colors are, consequently, also identical as far as the unsharpness is concerned so that colored fringes are avoided.

Since a telecentric path of rays is necessary for a proper working of the optical system an afocal focussing system 14 is provided which makes possible a short-range focussing by varying the distance of the lense of the focussing system.

The novel double reflecting surfaces may be employed in all cases to advantage in which the reflected beams of light must remain perfectly parallel. When used in connection with color photography their use is not limited to the embodiment shown but they may be employed also for taking or reproducing three or multi-color pictures with common or separate objectives.

It is to be noted that the air plates may be replaced by another gas or a liquid or that the corresponding parts may be also completely void.

I claim as my invention:

In combination, an afocal lens system, a plural zoned color filter, a beam splitter between said system and said filter and consisting of the same number of rhombic prisms as there are zones in said filter, each prism having an inlet and an outlet for light, with the inlet adjacent said system and the outlet adjacent said filter, and the prisms having contacting plane sides defining a surface with spaced recesses therein, each of said recesses having a depth on the order of a light wave and having a bottom surface parallel to said sides, the part of the contact surface with the recess therein being reflective to light from both sides thereof, the remaining part being transparent, said parts being so arranged that the parallel rays of light entering the inlet of any prism from said system are transmitted and reflected to emerge at said outlets in equal amounts and in parallel paths.

KURT RÄNTSCH.